Dec. 27, 1960 R. B. DE LANO, JR., ET AL 2,966,634

AMPLIFIER FOR ELECTROSTATIC MEMORY SYSTEM

Original Filed May 26, 1953

4 Sheets-Sheet 1

INVENTORS
DONALD R. YOUNG
RALPH B. DELANO, JR.

BY William J. Schelberg

AGENT

Dec. 27, 1960 R. B. DE LANO, JR., ET AL 2,966,634

AMPLIFIER FOR ELECTROSTATIC MEMORY SYSTEM

Original Filed May 26, 1953 4 Sheets-Sheet 2

INVENTORS
DONALD R. YOUNG
RALPH B. DELANO JR.

BY William J. Schelberg
AGENT

INVENTORS
DONALD R. YOUNG
RALPH B. DELANO, JR.
BY William J Scheiner
AGENT

AMPLIFIER FOR ELECTROSTATIC MEMORY SYSTEM

Original Filed May 26, 1953

4 Sheets-Sheet 4

INVENTORS
DONALD R. YOUNG
RALPH B. DELANO, JR.
BY William J. Schelberg
AGENT 2,966,634

AMPLIFIER FOR ELECTROSTATIC MEMORY SYSTEM

Ralph B. De Lano, Jr., and Donald R. Young, Poughkeepsie, N.Y., assignors to International Business Machines Corporation, New York, N.Y., a corporation of New York Original application May 26, 1953, Ser. No. 357,608, now Patent No. 2,846,615, dated Aug. 5, 1958. Divided and this application Oct. 21, 1957, Ser. No. 691,490

3 Claims. (Cl. 330—153)

This invention relates to an electrostatic memory system wherein binary information is stored in the form of charges established on the dielectric target surface of a barrier grid storage tube as described in the copending United States application, Serial Number 357,608, filed May 26, 1953, now Patent Number 2,846,615, to which this application relates as a division. In particular, this invention is directed to a novel amplifier circuit for use in the system described in the aforesaid patent and in other systems.

The charges established on the target of an electrostatic storage tube are not permanent and must be systematically regenerated; however, regeneration signals ditrimentally affect the response characteristics of the output amplification circuits.

Accordingly, an object of the invention resides in providing an improved system and circuit for operating barrier grid storage tubes, and in particular a novel amplification system.

Other objects will be pointed out in the following description and claims and illustrated in the accompanying drawings which disclose by way of example the principle of the invention and a contemplated mode of applying the principle.

In the drawings:

Fig. 1 graphically illustrates the timing and control pulses employed and the waveforms of pulses applied to the control grid and backing plate of a barrier grid storage tube operated in accordance with the method described in the aforementioned patent.

Figure 2:
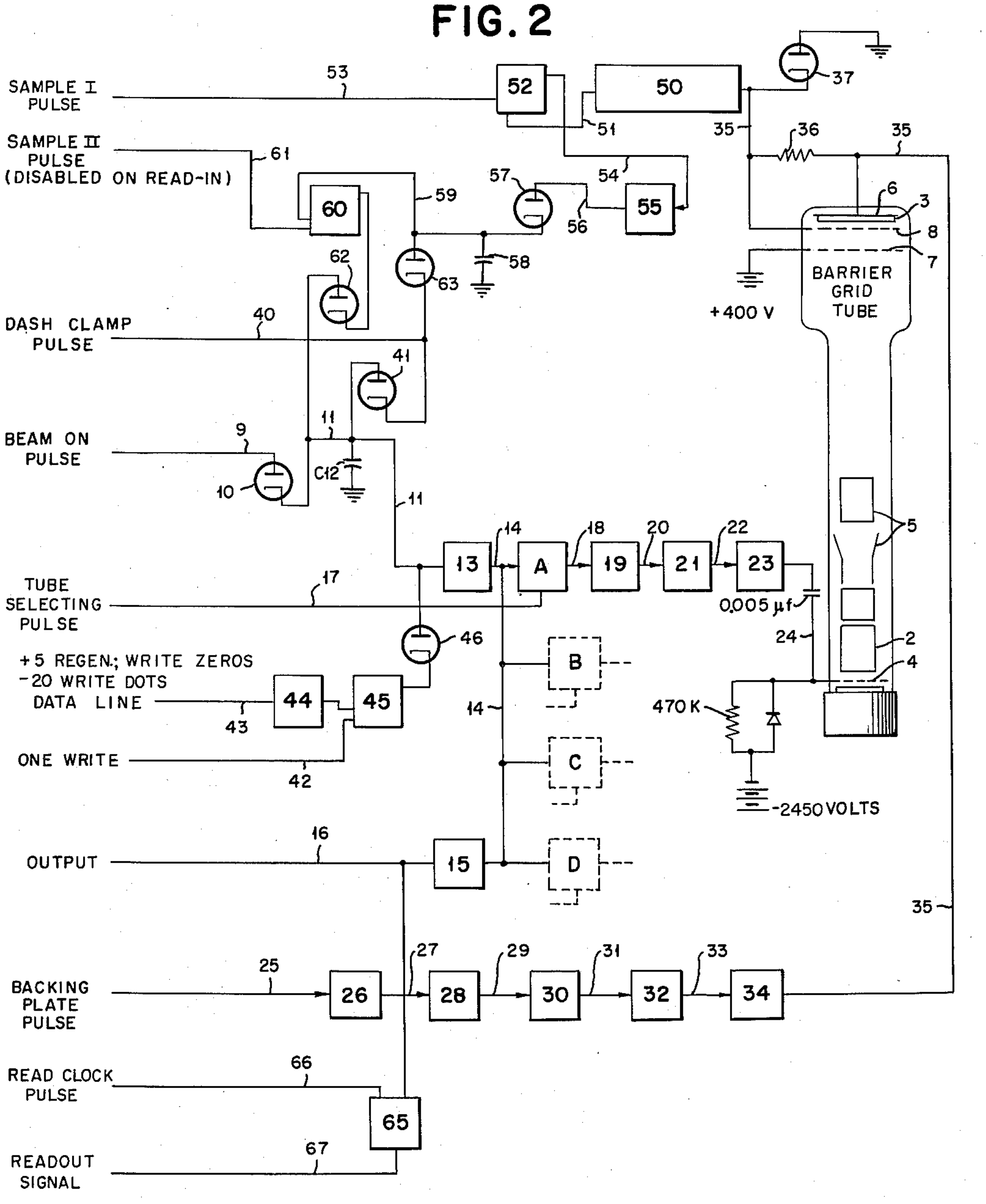
Fig. 2 is a block diagram of the system for electrostatic storage.

Referring to Fig. 2 of the drawing, a storage delay tube of the barrier grid type is illustrated having an envelope 1 within which is positioned an electron gun 2 for forming and focusing an electron beam on a target 3. The beam is turned on under the control of a schematically illustrated grid 4 and is directed to particular elemental areas on the target 3 by pairs of deflection plates 5. As is well known in the art, these pairs of deflection plates 5 are physically arranged to produce electrostatic fields at right angles to one another and to the beam. It is to be understood that these plates will have varying voltages applied to them from a saw-tooth generator, for example, in order to produce line and frame scansion as in a television raster or staircase type scanning system; however, appropriate voltages may be applied to the plates for producing spiral scansion or only single line scansion as may be desired. The means for producing different types of scansion of the target surface 3 are well known in the art and, as they are not required for an understanding of the invention, need not be further described here.

The method of reading out a stored charge from the backing plate 6 imposes an amplifier recovery problem since this electrode is pulsed with a potential of relatively high magnitude during the immediately preceding writing operation while the output signal to be amplified is comparatively small. The backing plate modulating pulse charges the coupling and inherent interelectrode capacities of the amplifier tubes and must either be dissipated before the small output signal can be amplified or some means provided for lessening the effect of the backing plate pulse on the amplifier. In the arrangement employed, novel amplifier stages having a high recovery rate are used and in addition diodes may be provided, as will be later described, to limit the magnitude of the backing plate pulse impressed on the amplifier input circuit. Further, since the backing plate pulse and reading operation occur at regular intervals, the amplifier need not be completely recovered from the backing plate pulse before the tube is interrogated as the amplitude of the read out signal will not be dependent upon a variable time interval. With this novel arrangement, a read-out operation may follow a write operation more closely than heretofore possible.

Inasmuch as the target is a nonconductor, the potentials at the different regions or spots will remain essentially unchanged for some time despite spill from adjacent spots; however, where the unit of information is to be retained for a long period, it must be regenerated periodically. Regeneration of the information stored on the tube target is done in a systematic fashion and consists in examining each spot to determine which charge state has been stored and thereafter restoring the original charge as will be more fully described hereafter.

Figure 1:
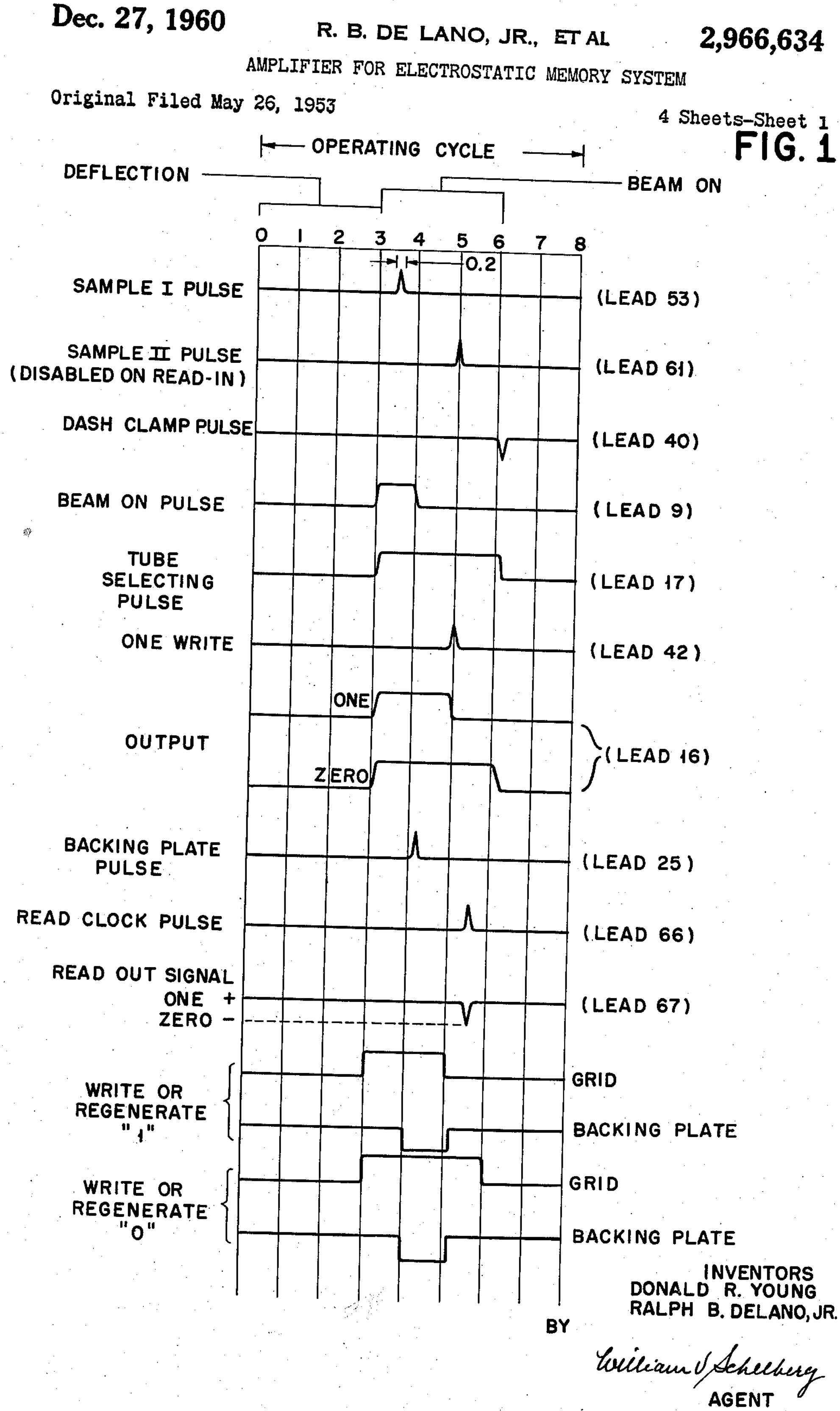

The resetting operating cycle illustrated graphically in Fig. 1 requires eight microseconds, of which the first three microseconds constitute a deflection time interval during which the beam becomes stabilized at one position. The beam-on time requires a second period of three microseconds with the first microsecond of this period employed in obtaining information from the tube, in providing a time for resetting when a "one" or positive charge is written and in erasing a previously stored positive charge. The latter function is provided to prevent the charge from increasing or repeatedly writing a "one" in the same region. The second microsecond of this period of beam-on time is coincident with the backing plate pulse and writes a "one" or positive charge on the dielectric target area as well as providing a time for switching during regeneration. The third microsecond of beam-on time is employed only when a "zero" is written as will be apparent from observation of the waveforms at the lower portion of Fig. 1. Six microseconds are made available for the amplifier to recover from the backing plate pulse between the time of termination of the pulse at the end of the fifth microsecond and the time of reading out the information beginning with the fourth microsecond of the succeeding operating cycle.

Referring to the block diagram of the system as shown in Fig. 2, sample pulse I, sample pulse II, dash clamp pulse, beam-on pulse and the backing plate pulse are clock pulses delivered from ring circuits or the like and appear at terminals shown at the left of the figure at the times during each cycle of operation as graphically illustrated in Fig. 1.

The function of the circuit components may be summarized as follows: In the storing of either a binary "one" or "zero," the cathode beam is turned on at 3.0 microseconds time with the backing plate pulse applied at 4.0 microseconds time and terminated at 5.12 microseconds time. In writing or storing a "one," the one write pulse discharges condenser C12 at 5.0 microseconds time and cuts off the cathode beam as well as terminates the output pulse before the backing plate pulse is terminated. In writing a "zero," the dash clamp pulse discharges condenser C12 and turns the cathode beam off and terminates the output pulse after the backing plate pulse is terminated.

In regenerating a "one," the condenser C12 is discharged through the diode 62 and "and-inverter" 60 at 5.0 microseconds time as determined by the appearance of the sample II pulse. In regenerating a "zero," the condenser C12 is discharged at 6.0 microseconds time by the dash clamp pulse as in writing a "zero."

The pulses appearing on output line 16 indicate by their duration if a "one" or a "zero" has been read out and regenerated. Line 16 is coupled to one input terminal of an "and-inverter" circuit 65 and a line 66 is coupled to the other input terminal. A positive clock pulse appearing on line 66 at 5.50 microseconds is in time coincidence only with the positive potential on line 16 when a "zero" is read out. Output line 67, therefore, is negative on read-out of a stored "zero" and positive on read-out of a stored "one."

It is to be noted that in reading out the "one" or positively charged region, the charge that exists prior to bombardment by the cathode beam is completely neutralized and that the regenerated charge is produced during the period that the backing plate pulse is applied. This action is advantageous in that repeated regeneration of a particular region will not result in a higher potential charge building up with unequal read-out signal magnitudes being present.

Figure 3:
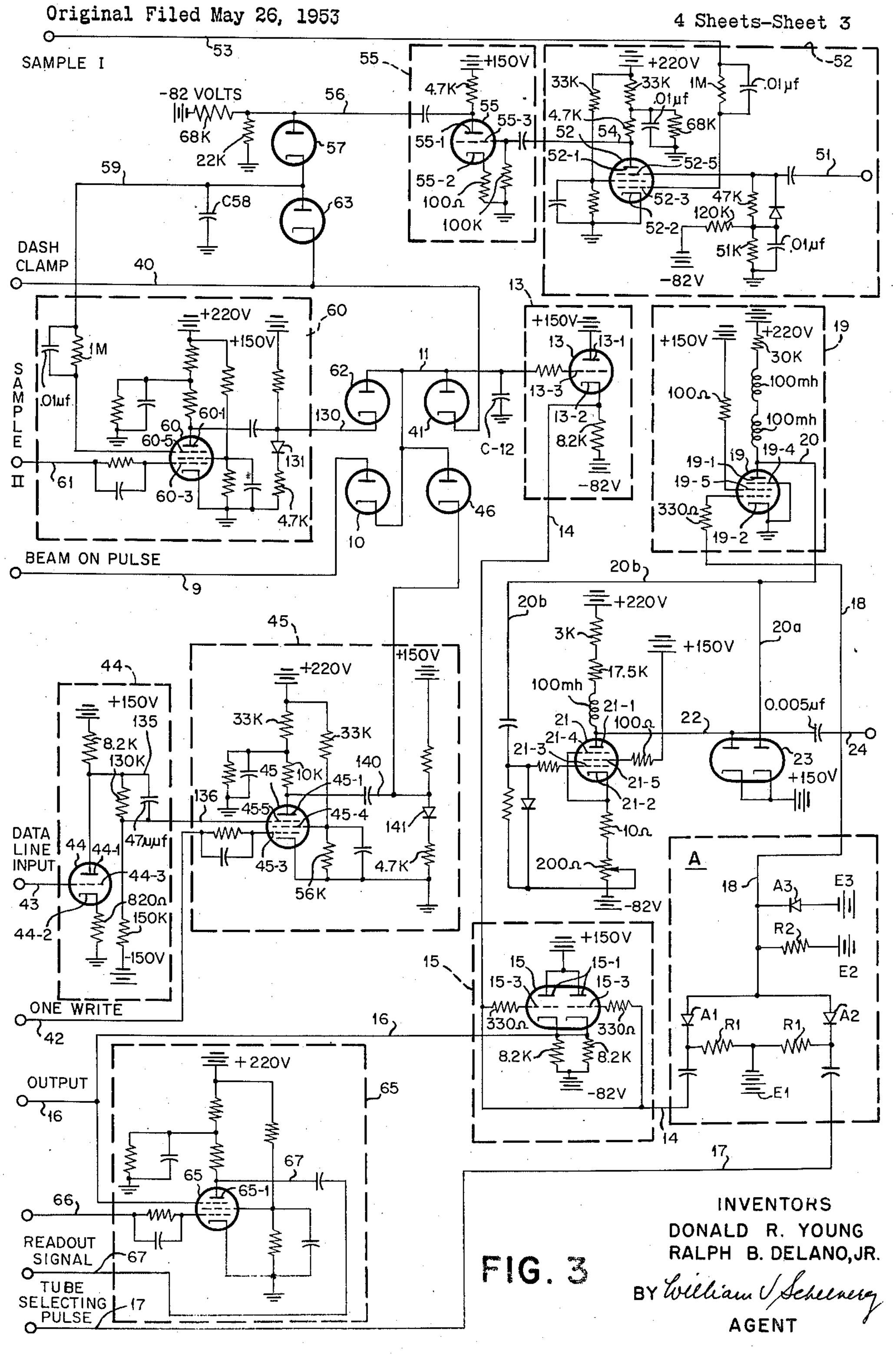
Figs. 3, 4 and 5 illustrate in detail the circuit components shown by block diagram in Fig. 2 with Figure 5 illustrating the novel amplifier circuit arrangement.
Figure 5:
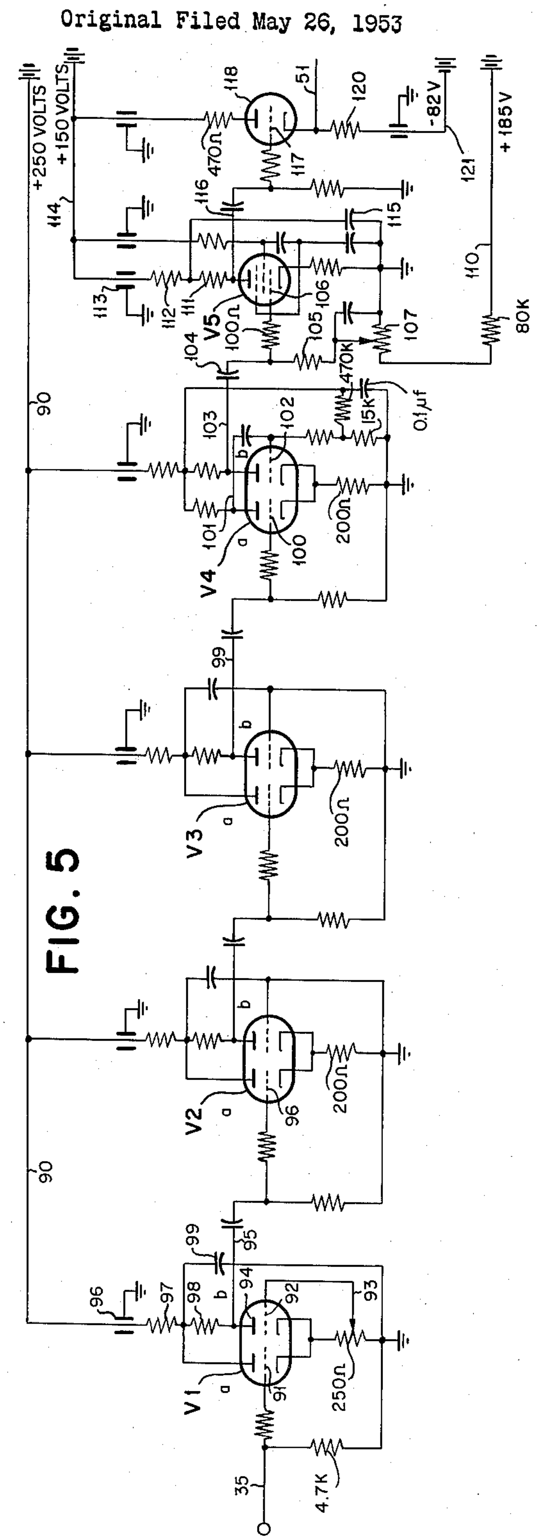
Figure 4:
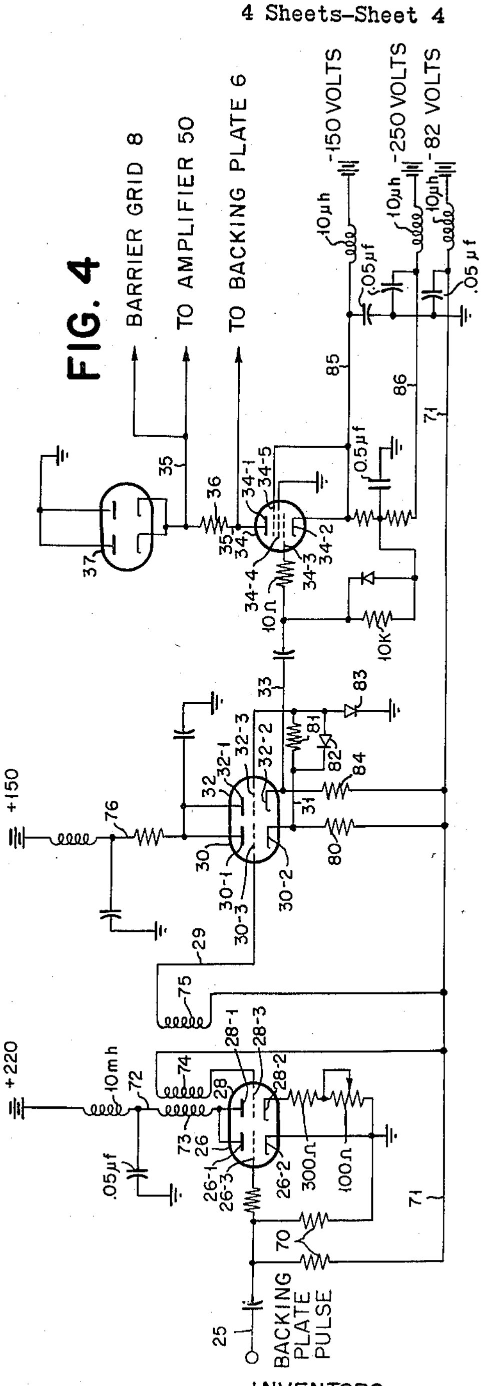

The circuit components shown in block form in Fig. 2 are illustrated in detail in Figs. 3–5 with the backing plate modulating circuit comprising components 26, 28, 30, 32 and 34 shown in detail in Figure 4 of the drawings. The backing plate clock pulse appears on terminal 25 as described, and is applied to grid 26–3 of pull over tube 26. The grid 26–3 is normally biased to cut off by connection to a resistor bridge 70 which is connected at one end to ground and at the other to a conductor 71 which is maintained at approximately −82 volts. The plate 28–1 of blocking oscillator tube 28 and the plate 26–1 of pull-over tube 26 are commonly coupled to a conductor 72 through a coil 73. Conductor 72 is connected to a +220 volt source through a filter circuit comprising a 10 mh. coil and .05 $\mu$f. condenser. The cathode 26–2 of the pull over tube is connected directly to ground and the cathode 28–2 of the oscillator tube is connected through a 300 ohm and 100 ohm adjustable resistor to ground. A coil 74 is inductively coupled with the coil 73 and is connected at one end to the conductor 71 and at the other end to the grid 28–3 of the oscillator tube. As the positive backing plate clock pulse appears on line 25 and is applied to the grid 26–3 this tube is rendered conductive and a current pulse flows through the coil 73. A voltage of opposite polarity is induced in coil 74 which drives the grid 28–3 of the oscillator tube positive and the latter then starts to conduct. Being commonly coupled through coil 73, this further increases the current in this coil until by this cumulative action, the grid 28–3 is driven in the positive region of tube saturation. When this condition takes place, the tube current begins to lessen and the grid potential becomes cumulatively more negative until the tube 28 completely cuts off. This blocking oscillator action results in a pulse of approximately one microsecond duration as determined by the constant of coils 73 and 74 and has a sharp rise and fall time with no overshoots. A coil 75 is inductively coupled with coil 73 and a voltage pulse is induced therein and applied through lead 29 to the grid 30–3 of the cathode follower tube 30. The plate 30–1 of this tube is connected to a line 76 and its cathode 30–2 connected to the −82 volt conductor 71 through a resistor 80. Line 76 is connected to a +150 volt source through a filter circuit comprising a 10 mh. coil and .05 $\mu$f condenser. As the positive pulse induced in coil 75 is applied to the grid 30–3, tube 30 is rendered conductive and a positive output pulse appears on line 31 which is connected to the cathode of this tube. This positive pulse is applied to the grid 32–3 of a second cathode follower tube 32 through a clipping circuit comprising resistor 81 and a pair of diodes 82 and 83 with resistor 81 providing a fairly high input impedance to tube 32. The plate 32–1 is connected to the plate 30–1 and energized from the same potential source through line 76 and the cathode 32–2 is connected to line 71 through resistor 84. Output lead 33 is connected to cathode 32–2 and is normally negative, however, as the grid 32–3 is pulsed positively and tube 32 conducts, the cathode swings positively and a positive output pulse of approximately one microsecond duration appears on line 33 and is applied to the inverter circuit 34. The plate 34–1 of the inverter tube 34 is connected to lead 35 which is normally held at ground potential by the connection through a resistor 36 and diode 37. The cathode 34–2 and suppressor grid 34–5 are connected to a line 85 held at −150 volts while the screen grid 34–4 is grounded. The control grid 34–3 is biased negatively through a paralleled 10K resistor and diode coupled to a bleeder which is connected across the lines 85 and 86.

As the positive pulse is applied over conductor 33 and through a 10 ohm resistor to the grid 34–3, tube 34 is rendered conductive and the plate 34–1 and output lead 35 connected thereto, swings negatively. The output lead 35 is connected to the backing plate 6 with resistor 36 connected as shown between the backing plate and barrier grid 8.

In the actual operating model constructed, the inverter circuit comprises four pentodes identical to the one illustrated, connected in parallel. In like manner, diode 37 which is coupled to conductor 35 comprises four double diodes also connected in parallel in order to provide the capacity needed and to save space required for mounting a single tube of larger capacity.

Referring now to Fig. 3, it will be recalled that if a "one" is to be stored the data line conductor 43 is held at a negative value and a positive one write pulse is applied to line 42 at 5.0 microseconds time. The data line conductor 43 is coupled with inverter circuit 44 which comprises a tube 44 having a plate 44–1 connected through an 8.2K resistor to a +150 volt source and a cathode 44–2 connected through an 820 ohm resistor to ground. A conductor 135 is connected to the plate 44–1 and is connected through a 130K resistor and 150K resistor to a −150 volt source. Output lead 136 is connected to the junction of these two resistors and is held at a low positive potential when tube 44 is in a non-conducting state. The data line input lead 43 is coupled with the grid 44–3 and the tube is held in a non-conducting condition when writing a "one" so that lead 136 is held at a positive potential supplied from the 150K and 130K resistor bridge and this potential is applied to the suppressor grid 45–5 of the "and-inverter" tube 45. The positive one write pulse appearing on line 42 is applied to the control grid 45–3 and, when the polarities of both grids 45–3 and 45–5 are coincident and positive at 5.0 microseconds time tube 45 conducts. The plate 45–1 of tube 45 is connected through a 10K and a 33K resistor to a +220 volt source and the screen grid 45–4 is connected to the junction of a resistor bridge comprising a 56K and 33K resistor which is connected between ground and the aforementioned +220 volt supply. An output lead 140 is connected to the plate 45–1 and is positive when the tube is in a non-conducting state. When the tube 45 fires at 5.0 microseconds time as in writing a "one," the output lead 140 is connected to ground through the tube and thus swings negatively lowering the potential of the cathode of diode 46 to which it is also connected. The condenser C12 then is discharged through a path including diode 46, a crystal diode 141 and 4.7K resistor to ground as shown.

If a "zero" is to be stored, the data line potential on conductor 43 is held at a positive value and inverter tube 44 conducts so that output line 136 is subjected to a negative potential swing as the plate 44–1 and lead 135 become less positive. With a negative output pulse on lead 136, there is no coincident polarity of inputs to "and-inverter" 45 at 5.0 microseconds time when the one write pulse appears on conductor 42 and the inverter circuit 45 does not function to discharge condenser C12. In this case, however, the dash clamp pulse, which appears on conductor 40 at 6.0 microseconds time, pulls the cathode of diode 41 negatively and condenser C12 is discharged through the diode 41 at this time.

As previously mentioned, the amplifier circuit 50 is subjected to the large negative backing plate pulse from 4.0 to 5.12 microseconds time and, in reading out a stored positive charge, must faithfully reproduce a small negative pulse during the fourth microsecond interval of the cycle. It is for this reason that a six microsecond interval is provided in the cycle between the backing plate pulse and readout amplification and this period allows the amplifier elements to recover from the backing plate pulse prior to reading the signal pulse. The amplifier circuit 50 is illustrated in detail in Fig. 5 and is designed for a high recovery rate. The novel features of the amplifier circuit include use of cathode coupled stages followed by a single pentode stage with a short time constant coupling circuit employed between the several cathode coupled stages and the pentode stage. A variable positive bias is utilized by the pentode stage to limit overshoots caused by the short time constant input and to give maximum gain at the moment the barrier grid tube is interrogated and a read-out signal obtained from the backing plate.

The diode bank 37 (Fig. 4) is provided to limit the magnitude of the backing plate pulse applied to the amplifier 50, however, if the barrier grid 8 is grounded rather than connected to lead 35, satisfactory operation may be obtained. In such a modification, the beam current has to swing the large barrier grid to backing plate capacity on read-out and as a result the output signal is of lesser magnitude compared with the arrangement shown in Fig. 2. Grounding the barrier grid has the advantage that electrons intercepted thereby do not appear in the output. The diode bank 37 also isolates the amplifier from ground during signal time. If no diodes were used and the amplifier connected directly to the backing plate, the amplifier input resistance would be limited by the value of resistor 36. The resistor 36 is normally a few hundred ohms so that the large barrier grid to backing plate capacitance may be charged and discharged in a fraction of the backing plate pulse time. If this resistor were to serve as the amplifier input resistance, more amplifier stages would be required.

Lead 35 is subjected to both the large backing plate pulse and the read-out signal pulse and, as shown to the left in Fig. 5, is coupled to the input of the amplifier 50 which is illustrated in detail in this figure. Four cathode coupled grounded grid stages V1 to V4 are provided with the plates of the tubes comprising these stages commonly connected to a lead 90 maintained at a potential of +250 volts. The cathodes of tubes V1*a* and V1*b* of the first stage V1 are connected through a 250 ohm resistor to ground and those of stages V2–V4 are connected through respective 200 ohm resistors to ground. The tubes comprising amplifier stages V1 to V4 are normally conductive through the above described paths. On application of a negative backing plate pulse or a negative read-out pulse to lead 35, grid 91 of the tube V1*a* is driven more negative and thereby reduces the conductivity of the tube and consequently the current flow through the aforementioned 250 ohm cathode resistor. As this occurs the cathode of tube V1*b* becomes more negative with respect to the grid 92 which is adjustably connected to the 250 ohm cathode resistor by lead 93. This then has the same relative effect as a positive pulse applied to the grid 92 and the conductivity of tube V1*b* increases lowering the potential of its plate 94 for a period of time equal to the duration of the input pulse.

A feed through type capacitor 96 and resistor 97 are connected in series between the lead 90 and upper terminal of a plate resistor 98, with this terminal also connected to ground through a capacitor 99. The elements 96, 97 and 99 comprise a high frequency filter network which assures no spurious signals appear on the plate circuit to be transferred to an output signal lead 95 which is connected to the plate 94.

It is to be noted at this point that the conventional amplifier normally inverts a negative input signal so as to produce a large positive output. Thus, if the backing plate pulse were conventionally amplified, the positive output obtained would be sufficiently large to drive the grid of a following stage positive with respect to its cathode causing the grid to conduct current. This grid current would charge up the normally employed coupling capacitor and it would remain charged when the backing plate pulse decayed so that the grid would have a bias which would cut off the tube. Until the coupling capacitor discharges, the tube could not amplify any signal. The discharge time of such a coupling capacitor would be longer than the charge time as it charges through the grid to cathode impedance, which is very low when the grid is positive with respect to the cathode but otherwise very high. The use of cathode coupled grounded stages V1 to V4 avoid this problem as the input is not inverted and the backing plate pulse remains negative until the signal is of appreciable magnitude with respect to the backing plate pulse.

The negative output pulse appearing on lead 95 is applied to the grid 96 of the succeeding cathode coupled stage V2 and the output from stage V2 is applied to the succeeding stage V3, both of which function in an identical manner described in connection with the stage V1. The amplified negative output pulse sensed from the plate of tube V3B appears on lead 99 and is fed to the grid 100 of tube section *a* of stage V4. This negative pulse reduces the current flow in this stage in the same manner as described in connection with tube section *a* of stage V1. The cathode of V4*b* is then subjected to a negative pulse as in the preceding stages due to the decrease in current through the 200 ohm cathode resistor with the same resultant effect on the tube conductivity as if a positive pulse were applied to its grid. The plate of tube V4*a* becomes more positive as tube conductivity lessens and a positive pulse appears on lead 101 connected to this element and is applied to grid 102 of tube V4*b* which is positively biased through the bridged 15K and 470K resistors shown. The previously described negative pulse applied to the cathode of tube V4*b* and the positive pulse applied through lead 101 to its grid 102 are in phase and a boosting effect is produced. A negative output signal appears on lead 103 connected to the plate of tube V4*b* and is differentiated by a condenser 104 and resistor 105 which serve to shorten the apparent length of the amplified backing plate pulse. This differentiated pulse is applied through a 100 ohm resistor to the control grid 106 of a pentode tube V5. A positive bias is applied to the grid 106 through an adjustable resistor 107 connected at one end through an 80K resistor to a lead 110, maintained at a potential of approximately +185 volts. The other end of resistor 107 is connected to ground. The plate of the pentode tube V5 is connected through a plate resistor 111, a resistor 112 and a condenser 113 to a conductor 114 which is maintained at a potential of +150 volts. The elements 112 and 113 and a condenser 115 comprise a high frequency filter network similar to that described in connection with the V1 stage and which is also employed in each of the stages V2, V3 and V4.

The output signal is taken from the plate of the pentode and appears as a positive pulse on lead 116 since the negative pulse applied to the grid 106 reduces the conductivity of the pentode V5 and lessens the IR drop across the resistors 111 and 112 and the plate approaches more nearly the voltage of the 150 volt plate supply source. The output pulse on lead 116 is applied to grid 117 of a cathode follower tube 118. The plate of the tube 118 is connected through a 470 ohm resistor to lead 114 and its cathode connected through a resistor 120 to a conductor 121 which is maintained at a potential of −82 volts. As the positive pulse is applied to grid 117, the tube 118 conducts and the potential of its cathode increases so that a positive pulse appears on output lead 51, which is connected thereto and, as shown in Fig. 2, is coupled to the input of the "and-inverter" circuit 52.

The "and-inverter" circuit 52 is shown in detail in the upper right hand portion of Fig. 3 and consists of a pentode 52 having control grid 52–3 and suppressor grid 52–5. The plate 52–1 is connected through a 4.7K resistor and a 33K resistor to a +220 volt source and its cathode 52–2 is grounded as shown. A high frequency filter network is provided by the paralleled 0.1 μf. condenser and 68K resistor connected to the junction of the two aforementioned resistors and serves to prevent application of spurious signals to the plate circuit. The positive output pulses from amplifier 50 are applied via lead 51 to the grid 52–5 and the positive sample I pulse is applied over conductor 53 to the second grid 52–3. Coincident application of pulses of like polarities to both of these grids causes the tube 52 to conduct and the output lead 54 which is connected to the plate 52–1 of the tube is subjected to a reduction in potential for the duration of tube conductivity so that a negative output pulse is produced. As the backing plate pulse is applied to the memory tube from 4.0 microseconds time to 5.12 microseconds time while the sample I pulse appears at 3.46 microseconds time, there is no coincidence of inputs to the grids 52–3 and 52–5 and the pentode 52 does not conduct. The output lead 54, therefore, remains at the potential of plate 52–1 during this interval. The read-out signal pulse is obtained while the cathode beam is turned on from 3.0 to 4.0 microseconds time and after amplification appears at grid 52–5 coincident in time with the appearance of the sample I pulse on grid 52–3 and a negative output pulse is produced at the plate of tube 52.

The negative output pulse then appearing on line 54 is applied to the grid 55–3 of inverter tube 55. Plate 55–1 is connected to +150 volt source through a 4.7K resistor and cathode 55–2 is grounded through a 100 ohm resistor and the tube is normally in a conductive state with output lead 56, connected to plate 55–1, held at a low positive value. As the negative input pulse appears at grid 55–3, tube conductivity is reduced and the potential of the plate 55–1 and output lead 56 approaches the +150 volt potential of the plate supply source. This positive voltage swing is applied to the anode of diode 57 overcoming the negative bias from the bridged 68K and 22K resistors and, as described in connection with the Fig. 2 block diagram, is effective to charge condenser C58.

The positive pulse is also applied through lead 59 to the "and-inverter" 60 which operates in a manner similar to the previously described circuit 52 with the positive input pulse from line 59 applied to suppressor grid 60–5 and the sample II positive clock pulse applied through lead 61 to control grid 60–3. The output lead 130 is connected to the plate 60–1 and, as the latter swings to a less positive value on conduction of the tube, a negative pulse is applied to the cathode of diode 62 to allow the condenser C12 to discharge through a path including the diode 62, conductor 130, a crystal diode 131 and a 4.7K resistor to ground.

As the condenser C12 is discharged, the output of cathode follower 13 becomes negative and the cathode beam is cut off and the cathode follower tube 15 is simultaneously extinguished to terminate the output pulse on line 16. Condenser C58 is then discharged by the dash clamp pulse which is applied to lead 40 at 6.0 microseconds time and pulls the cathode of diode 63 negative providing a discharge path through this circuit and preparing condenser C58 for the next cycle of regenerative operation.

As shown graphically in Fig. 1, the output pulses appearing on conductor 16 indicate read-out of a "zero" or a "one" by the length of the output pulse. Output lead 16 is coupled to one input terminal of an "and-inverter" circuit 65 and a positive clock pulse is applied at 5.50 microseconds time on a lead 66 connected to the second input terminal. The "and-inverter" circuit 65 is substantially identical to the previously described circuit 45 and, to avoid repetition, will not be structurally described. It will be seen that coincidence of both the clock pulse on lead 66 and the output pulse on lead 16 occurs only when a "zero" is read out and that at this time both of the control grids are simultaneously positive so that lead 67, which is connected with the plate 65–1, swings negatively at 5.50 microseconds time. When a one is read out, line 16 is negative at 5.50 microseconds time and the positive pulse appearing on line 66 is ineffective to cause tube 65 to conduct so that the output lead 67 remains at a positive potential.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An amplifier circuit comprising, in combination, a plurality of cathode coupled triode amplifier stages and a single pentode amplifier stage, each of said cathode coupled stages comprising a pair of triode discharge devices, a common resistor means connecting the cathodes of each of said pairs of triodes to ground, a source of plate potential, means connecting the plate electrodes of each of said cathode coupled stages to said source, input terminals for each stage connected with the grid electrode of a first of each of said pair of triodes, output terminals for each stage connected with the plate electrode of a second of each of said pair of triodes, circuit means connecting the grid electrode of said second triode of each pair to its associated common cathode resistor whereby the relative potential therebetween is determined by the current flow in said resistor, means connecting the output terminal of each stage and the input terminal of the succeeding stage, booster control circuit means coupling the plate of the first triode and grid of the second triode of the terminal stage of said plurality of triode stages and means providing a positive bias to the grid of said second triode of said terminal stage, short time constant coupling means connecting said terminal triode stage and said pentode stage and means for energizing said pentode stage including variable positive control grid bias means.

2. An amplifier circuit comprising, in combination, a plurality of cathode coupled amplifier stages each comprising a pair of triode discharge devices, resistor means connecting the cathodes of each of said pairs of triodes to ground, a source of plate potential, means connecting the plate electrodes of each of said pairs of triodes to said source, means connecting the grid electrode of the first triode of each pair to its associated resistor means, means connecting the plate electrode of said first triode to the grid of the second triode of the pair comprising a succeeding stage, booster control circuit means coupling the plate of the first triode and grid of said second triode of the last cathode coupled amplifier stage and means providing a positive bias to the grid of said second triode, a pentode tube amplifier stage, means including a short time constant differentiating circuit coupling the plate of the second triode of said last cathode coupled amplifier stage to the grid of said pentode stage tube, means for energizing said pentode tube including means providing variable positive grid bias.

3. An amplifier circuit comprising, in combination, a plurality of cathode coupled triode amplifier stages coupled with a single pentode output stage, said triode amplifier stages each comprising a pair of triodes including an input and an output triode, resistor means connecting the cathodes of each of said pair of triodes to ground, a source of plate potential, means connecting the plates of said triodes to said source, control means connecting said resistor means to the grid of the output triode of each cathode coupled stage, means including a capacitor connecting the plate of the output triode of each triode amplifier stage with the grid of the input triode of the next succeeding triode amplifier stage, means providing positive grid bias for the last cathode coupled stage triode, booster control circuit means coupling the grid of said last triode and plate of the associated triode of the last cathode coupled stage, means comprising a short time constant circuit coupling said last triode stage and said pentode output stage.

References Cited in the file of this patent

UNITED STATES PATENTS

| | | |
|---|---|---|
| 2,762,965 | Walker | Sept. 11, 1956 |
| 2,786,902 | Walter | Mar. 26, 1957 |
| 2,818,504 | De Shong | Dec. 31, 1957 |
| 2,863,122 | Finkel et al. | Dec. 2, 1958 |
| 2,866,018 | Bell | Dec. 23, 1958 |